US010769262B1

(12) United States Patent
Ziraknejad et al.

(10) Patent No.: US 10,769,262 B1
(45) Date of Patent: Sep. 8, 2020

(54) ENABLING USE OF CREDENTIALS

(71) Applicant: MicroStrategy Incorporated, Vienna, VA (US)

(72) Inventors: Siamak Ziraknejad, Reston, VA (US); John Gehret, Washington, DC (US); Gang Chen, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 686 days.

(21) Appl. No.: 14/599,036

(22) Filed: Jan. 16, 2015

Related U.S. Application Data

(60) Provisional application No. 61/928,643, filed on Jan. 17, 2014.

(51) Int. Cl.
*G06F 21/33* (2013.01)
*G06F 21/45* (2013.01)
*G06F 21/41* (2013.01)

(52) U.S. Cl.
CPC .............. *G06F 21/33* (2013.01); *G06F 21/45* (2013.01); *G06F 21/41* (2013.01)

(58) Field of Classification Search
CPC ....... H04L 63/10; H04L 41/28; G06Q 30/018; G06Q 50/18; G06F 21/33; G06F 21/41; G06F 21/45
See application file for complete search history.

(56) References Cited

U.S. PATENT DOCUMENTS

| 6,205,480 | B1 * | 3/2001 | Broadhurst ......... H04L 63/0815 707/999.009 |
| 8,811,895 | B2 | 8/2014 | Reisgies et al. |
| 9,038,152 | B1 * | 5/2015 | Vazquez ................. H04L 63/08 726/6 |
| 9,264,856 | B1 * | 2/2016 | Kotab ................... H04W 4/023 |

(Continued)

FOREIGN PATENT DOCUMENTS

| EP | 3041186 A1 | 7/2016 | |
| WO | WO-2008021454 A2 * | 2/2008 | ............. G06F 21/31 |

OTHER PUBLICATIONS

Bassam Farroha and Deborah Farroha, Architecturing dynamic privileges in protected systems through hardening Identity and Access Management, IEEE, https://ieee.org/document/6189527?source=IQplus (Year: 2012).*

*Primary Examiner* — Minnah L Seoh
*Assistant Examiner* — Debra L Glennie
(74) *Attorney, Agent, or Firm* — Fish & Richardson P.C.

(57) ABSTRACT

A system enables use of credentials, including determining that a user has been authorized by a first credential-issuing organization and enabling the user to use a first credential issued by the first credential-issuing organization based on the determination that the user has been authorized by the first credential-issuing organization. Trust data indicating whether the user should be enabled to use a second credential issued by a second credential-issuing organization as a result of the user having been authorized by the first cre- (Continued)

dential-issuing organization is accessed. A determination is made that the accessed trust data indicates that the user should be enabled to use the second credential issued by the second credential-issuing organization as a result of the user having been authorized by the first credential-issuing organization, and the user is enabled to use the second credential.

20 Claims, 15 Drawing Sheets

(56) References Cited

U.S. PATENT DOCUMENTS

| | | | |
|---|---|---|---|
| 9,276,917 B2* | 3/2016 | McColgan | H04L 67/26 |
| 9,397,980 B1* | 7/2016 | Chen | H04L 9/3263 |
| 9,413,743 B2 | 8/2016 | Robert | |
| 9,418,210 B2 | 8/2016 | Maher et al. | |
| 9,438,597 B1* | 9/2016 | Taylor | H04L 63/10 |
| 9,563,761 B1* | 2/2017 | Ziraknejad | G06F 21/32 |
| 2003/0023880 A1* | 1/2003 | Edwards | H04L 63/102 |
| | | | 726/1 |
| 2003/0065940 A1* | 4/2003 | Brezak | H04L 63/0815 |
| | | | 726/4 |
| 2003/0163686 A1* | 8/2003 | Ward | G06F 21/33 |
| | | | 713/156 |
| 2004/0010603 A1* | 1/2004 | Foster | H04L 63/0823 |
| | | | 709/229 |
| 2004/0049687 A1* | 3/2004 | Orsini | G06F 21/31 |
| | | | 713/189 |
| 2009/0132813 A1* | 5/2009 | Schibuk | G06Q 20/223 |
| | | | 713/158 |
| 2010/0064359 A1* | 3/2010 | Boss | G06F 21/32 |
| | | | 726/7 |
| 2011/0219427 A1* | 9/2011 | Hito | G06F 21/00 |
| | | | 726/3 |
| 2012/0138693 A1* | 6/2012 | Litz | G06K 7/1095 |
| | | | 235/494 |
| 2013/0346742 A1* | 12/2013 | Tada | H04L 63/0823 |
| | | | 713/155 |
| 2014/0189821 A1* | 7/2014 | Ying | H04W 12/04 |
| | | | 726/5 |
| 2014/0372321 A1 | 12/2014 | Khan | |
| 2015/0207789 A1* | 7/2015 | Kumar | G06F 21/33 |
| | | | 726/6 |

* cited by examiner

| | User Authorization by Organization 1 | ... | User Authorization by Organization N |
|---|---|---|---|
| Organization 1 Trust Level | Org 1 Credential 1: trusted<br>Org 1 Key 1: trusted<br>Org 1 Key 2: trusted | ... | Org 1 Credential 1: trusted<br>Org 1 Key 1: trusted<br>Org 1 Key 2: trusted |
| Organization 2 Trust Level | Org 2 Credential 1: trusted<br>Org 2 Key 1: trusted<br>Org 2 Key 2: not trusted<br>Org 2 Key 3: not trusted<br>Org 2 Key 4: trusted<br>Org 2 Key 5: trusted | ... | Org 1 Credential 1: trusted<br>Org 1 Key 1: trusted<br>Org 1 Key 2: trusted<br>Org 1 Key 3: trusted<br>Org 1 Key 4: trusted<br>Org 1 Key 5: trusted |
| ... | ... | ... | ... |
| Organization N Trust Level | Org N Credential 1: not trusted<br>Org N Key 1: not trusted<br>Org N Key 2: not trusted<br>Org N Key 3: not trusted<br>Org N Key 4: not trusted | ... | Org N Credential 1: trusted<br>Org N Key 1: trusted<br>Org N Key 2: trusted<br>Org N Key 3: trusted<br>Org N Key 4: trusted |

FIG. 15

ENABLING USE OF CREDENTIALS

CROSS-REFERENCE TO RELATED APPLICATION

This application claims priority from U.S. Provisional Application No. 61/928,643, filed Jan. 17, 2014, and titled "Enabling Use of Credentials," which is incorporated by reference.

TECHNICAL FIELD

This disclosure relates to enabling use of credentials.

BACKGROUND

Private and public organizations issue credentials to persons, for example, to signify completion of a set of requirements, membership in a particular group, permissions and/or authorizations that have been conferred to such persons, etc. Persons may use the credentials to verify completion of the set of requirements, membership in the particular group, possession of such permissions and/or authorizations, etc. In addition to credentials, the credential-issuing organizations may also issue resources related to the credentials, such as keys. Persons may use the keys, for example, to access one or more physical or logical resources.

SUMMARY

In one aspect, a method includes determining that a user has been authorized by a first credential-issuing organization, and based on determining that the user has been authorized by the first credential-issuing organization, enabling the user to use a first credential issued by the first credential-issuing organization. The method also includes accessing trust data indicating whether the user should be enabled to use a second credential issued by a second credential-issuing organization as a result of the user having been authorized by the first credential-issuing organization, the second credential-issuing organization being different from the first credential-issuing organization; determining that the accessed trust data indicates that the user should be enabled to use the second credential issued by the second credential-issuing organization as a result of the user having been authorized by the first credential-issuing organization; and enabling the user to use the second credential.

In some implementations, determining that the user has been authorized by the first credential-issuing organization may include receiving, at the server system and from a device of the user, first authentication information that is associated with the first credential-issuing organization and that identifies the user; accessing a user account for the user, wherein the user account is maintained by the server system; and determining, based on accessing the user account, that the first authentication information was validated by the first credential-issuing organization.

In some implementations, determining that the user has been authorized by the first credential-issuing organization may include receiving, at the server system and from the first credential-issuing organization, a message indicating that the user has been authorized by the first credential-issuing organization.

In some implementations, the method may include receiving, at the server system and from the second credential-issuing organization, at least part of the trust data indicating whether the user should be enabled to use a second credential issued by the second credential-issuing organization as a result of the user having been authorized by the first credential-issuing organization.

In some implementations, accessing the trust data may include accessing data indicating one or more trusted credential-issuing organizations. In these implementations, determining that the accessed trust data indicates that the user should be enabled to use the second credential issued by the second credential-issuing organization as a result of the user having been authorized by the first credential-issuing organization may include identifying the first credential-issuing organization in the data indicating one or more trusted credential-issuing organizations.

In some implementations, accessing the trust data may include accessing data indicating one or more conditions for the first credential-issuing organization to be considered a trusted credential-issuing organization. In these implementations, determining that the accessed trust data indicates that the user should be enabled to use the second credential issued by the second credential-issuing organization as a result of the user having been authorized by the first credential-issuing organization may include determining that the first credential-issuing organization has met the one or more conditions for being considered a trusted credential-issuing organization.

In some implementations, determining that the first credential-issuing organization has met the one or more conditions for being considered a trusted credential-issuing organization may include determining that the first credential-issuing organization has performed a re-authentication action for the user within a specified period of time.

In some implementations, the method may include accessing user-defined restriction data that has been received at the server system from the device of the user; and determining whether the accessed user-defined restriction data further restricts the trust data. In some implementations, the method also may include determining that the accessed user-defined restriction data indicates that the user should be enabled to use the second credential as a result of the user having been authorized by the first credential-issuing organization. In some implementations, the method also may include determining that the accessed trust data indicates that the user should be enabled to use a third credential issued by a third credential-issuing organization as a result of the user having been authorized by the first credential-issuing organization; determining that the accessed user-defined restriction data indicates that the user should not be enabled to use the third credential as a result of the user having been authorized by the first credential-issuing organization; and providing an indication to the device of the user that the user is not enabled to use the third credential.

In some implementations, enabling the user to use the second credential issued by the second credential-issuing organization may include determining that the second credential has already been received at the server system from the second credential-issuing organization; accessing the received second credential from a user account of the user; and providing the second credential to the device of the user.

In some implementations, enabling the user to use the second credential issued by the second credential-issuing organization may include determining that the second credential has not been received at the server system from the second credential-issuing organization; providing, to a system operated by the second credential-issuing organization, identifying information for the user; receiving, from the system operated by the second credential-issuing organization, the second credential; adding, by the server system, the second credential to a user account of the user; and providing the second credential to the device of the user.

In some implementations, enabling the user to use the second credential may include enabling the user to use the second credential without determining that the user has been authorized by the second credential-issuing organization in connection with a current log-in session.

In some implementations, the method may include determining a geographic location associated with the device of the user; determining one or more credential-issuing organizations within a region around the geographic location associated with the device of the user; and providing, to the device of the user, information regarding the one or more credential-issuing organizations.

In some implementations, the method may include determining a geographic location associated with the device of the user; determining a geographic region associated with the second credential-issuing organization; determining a match between the geographic location associated with the device of the user and the geographic region associated with the second credential-issuing organization. In these implementations, enabling the user to use the second credential may include enabling the user to use the second credential as a result of determining a match between the geographic location associated with the device of the user and the geographic region associated with the second credential-issuing organization.

In some implementations, the method may include enabling the user to use a physical resource associated with the second credential upon presentation of a representation of the second credential, wherein the representation of the second credential includes at least one of a Quick Response (QR) Code, an alphanumeric code, or a short-range wireless code.

In some implementations, the method may include determining that the accessed trust data indicates that user should not be enabled to use a key issued by the second credential-issuing organization as a result of the user having been authorized by the first credential-issuing organization; and providing the device of the user with an indication that the user is not enabled to use the key.

In some implementations, the method may include determining that the accessed trust data indicates that the user should be enabled to use a key issued by the second credential-issuing organization as a result of the user having been authorized by the first credential-issuing organization; and enabling the user to use the key, in addition to the first credential and the second credential.

In another aspect, a system includes at least one processor and at least one memory coupled to the at least one processor having stored thereon instructions which, when executed by the at least one processor, cause the at least one processor to perform operations that include determining that a user has been authorized by a first credential-issuing organization, and based on determining that the user has been authorized by the first credential-issuing organization, enabling the user to use a first credential issued by the first credential-issuing organization. The operations also include accessing trust data indicating whether the user should be enabled to use a second credential issued by a second credential-issuing organization as a result of the user having been authorized by the first credential-issuing organization, the second credential-issuing organization being different from the first credential-issuing organization; determining that the accessed trust data indicates that the user should be enabled to use the second credential issued by the second credential-issuing organization as a result of the user having been authorized by the first credential-issuing organization; and enabling the user to use the second credential; wherein determining that the user has been authorized by the first credential-issuing organization includes receiving, at the server system and from a device of the user, first authentication information that is associated with the first credential-issuing organization and that identifies the user; accessing a user account for the user, wherein the user account is maintained by the server system; and determining, based on accessing the user account, that the first authentication information was validated by the first credential-issuing organization.

In another aspect, at least one computer-readable storage medium encoded with executable instructions that, when executed by at least one processor, cause the at least one processor to perform operations that include determining that a user has been authorized by a first credential-issuing organization, and based on determining that the user has been authorized by the first credential-issuing organization, enabling the user to use a first credential issued by the first credential-issuing organization. The operations also include accessing trust data indicating whether the user should be enabled to use a second credential issued by a second credential-issuing organization as a result of the user having been authorized by the first credential-issuing organization, the second credential-issuing organization being different from the first credential-issuing organization; determining that the accessed trust data indicates that the user should be enabled to use the second credential issued by the second credential-issuing organization as a result of the user having been authorized by the first credential-issuing organization; and enabling the user to use the second credential.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIG. 15 is a diagram illustrating an example data structure that stores information related to credential management.

DETAILED DESCRIPTION

Figure 1:
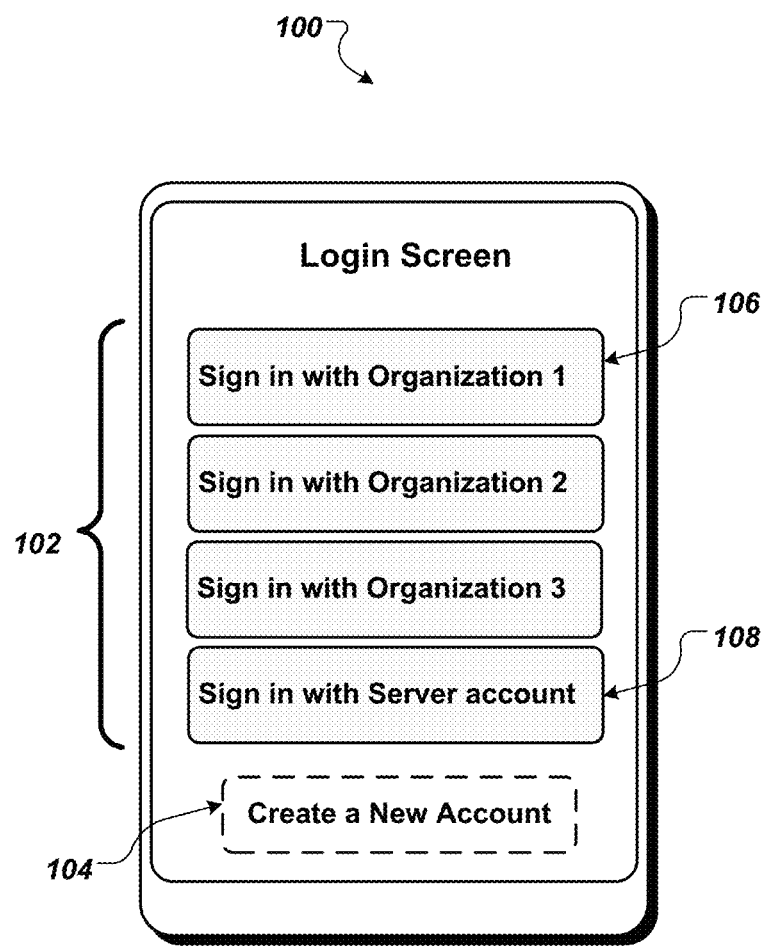
FIGS. 1-8 are diagrams illustrating example user interfaces that may be displayed to a user of a credential management application.

Techniques are described for controlling use of credentials and resources that are associated with the credentials. As examples, the credentials may be licenses issued by government organizations (e.g., a license to practice medicine, a driver's license, a passport, a travel visa, etc.), degrees issued by institutes of learning (e.g., a collegiate degree issued by a university), a status denoting membership in a particular group (e.g., a badge of employment issued by a company, a gym membership, etc.), or any type of credential an organization or institute bestows on individuals. A credential may have associated with it one or more resources, such as keys, that a user has been granted by the credential-issuing organization. For example, the keys may enable the user to access physical resources (e.g., opening a door to a secured office, operating an elevator in a building with access-controlled floors, using equipment with restricted access, etc.) or may enable the user to access logical resources (e.g., accessing information stored in a computing device, a computing network, an electronic account, etc.).

In some implementations, a mobile device-based credential management application enables multiple different credential-issuing organizations to use the application to distribute and manage electronic credentials that are issued by the credential-issuing organizations. The credential management application may be hosted by an entity that is separate from the credential-issuing organizations. In an example, the credential management application enables a user to log-in to the application using authentication information for any of the credential-issuing organizations that have issued the user a credential. In addition, other of the credential-issuing organizations can specify whether they trust the credential-issuing organization for which the user used log-in information to log-in to the credential management application, and the credential management application will enable the user to access the user's credentials and/or related resources (e.g., keys) for those credential-issuing organizations that trust the credential-issuing organization for which the user used log-in information to log-in to the credential management application.

As such, the credential management application may facilitate a user having access to different credentials and/or keys that were issued by different credential-issuing organizations, without the user necessarily being required to separately remember and provide authentication information (e.g., username and passwords) for each individual credential-issuing organization. Instead, in some implementations, the user may log-in to the credential management application using authentication information for any one of the different credential-issuing organizations (or using authentication information for the credential management application itself), and may gain access to a variety of credentials and/or keys issued by different organizations that trust that authentication information. In some examples, each credential-issuing organization can indicate different levels of trust for different types of authentication information. Further, in some implementations, the credential management application may be able to handle different types of authentication information and authentication techniques associated with different credential-issuing organizations, even those that are not necessarily part of a single-sign-on network. Thus, the credential management application may provide a flexible and secure environment in which users may more easily access credentials and/or related resources (e.g., keys) issued by different organizations.

In some implementations, the credential management application may use geo-location information (e.g., as provided by the user's client device, or by a third party, etc.) to manage credentials and/or related resources (e.g., keys) based on the location of the user's client device. As an example, the application may make recommendations about which credential issuing organization the user should use to log-in to the credential management application based on the user's location. As another example, if a user attempts to access credentials and/or keys for an organization (or resources belonging to that organization), the credential management application may first verify that the user's physical location corresponds to a geographic region associated with the organization (or resources belonging to that organization) before allowing the user the access the credentials and/or keys.

FIGS. 1-8 illustrate example user interfaces that may be displayed to a user of a credential management application. These interfaces may be displayed on a client device running a mobile credential management application. In these examples, the interfaces represent the user account of a user of the credential management application on a client device and may include credentials issued by one or more credential-issuing organizations.

Referring now to FIG. 1, an example user interface 100 is shown that illustrates a list of organizations 102 for a particular user to log-in with the credential management application. In this example, the user interface 100 shows four log-in options for a particular user, corresponding to four different organizations that have issued credentials and/or keys to the user. In some implementations, the interface 100 may also provide an option 104 for the user to create a new account with a different credential-issuing organization. Among the list of organizations 102 shown in the example of FIG. 1 is an option 106 to log-in with Organization 1, an option 108 to log-in with Organization 2, an option 110 to log-in with Organization 3, and an option 112 to log-in with a server that hosts the credential management application. When the user selects one of the four log-in options, for example, option 106 corresponding to Organization 1, another user interface is displayed to the user (as described below in relation to FIG. 2), such as a dialog box, prompting the user to supply the user's authentication information for Organization 1 to log-in to the credential management application.

The particular organizations that are displayed as log-in options in a login interface (e.g., in the list of organizations 102 in FIG. 1) may be determined by any criteria. For example, the list 102 may indicate the credential-issuing organizations that have issued credentials to the last user who logged in to the credential management application from the particular mobile device. Alternatively, if only one user is allowed to log in to the credential management application from the particular mobile device, then the list 102 may indicate the credential-issuing organizations that have issued credentials to that user.

Figure 2:
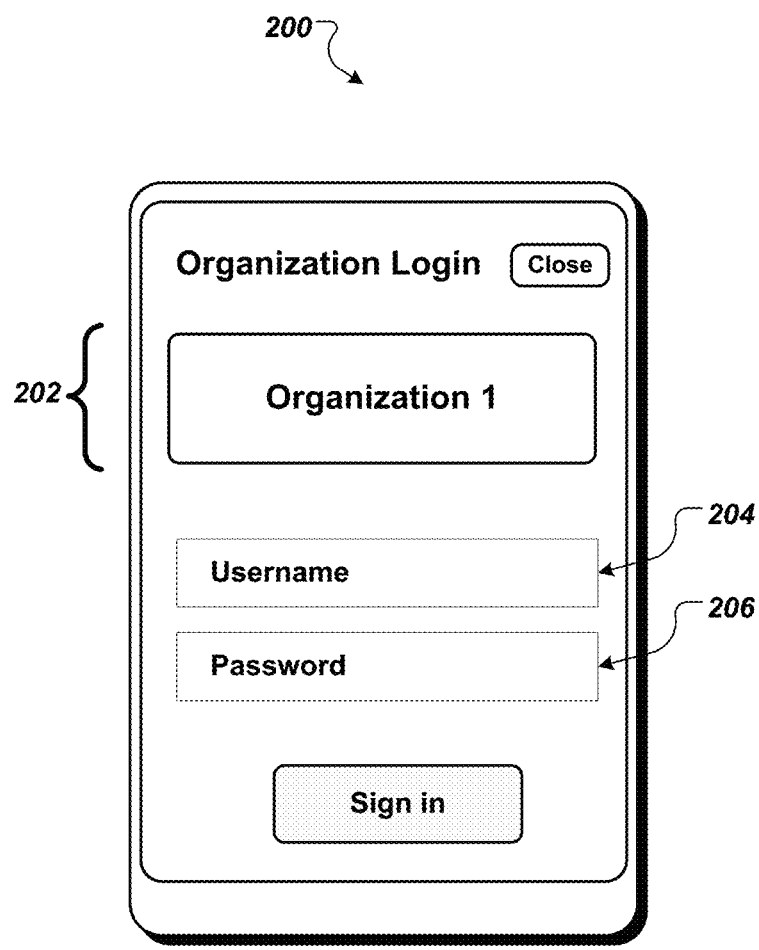

Referring now to FIG. 2, an example user interface 200 is shown that illustrates a log-in screen for a particular user to log into the credential management application. In this example, the user interface 200 provides a text display 202 indicating that the log-in corresponds to Organization 1. The user interface 200 shows a log-in option in which the particular user can provide a username, in input field 204, and password, in input field 206, that has been registered with Organization 1. In general, any suitable type of authentication information and authentication technique may be used.

For example, if the user wishes to use a credential confirming that the user received a Master's degree from a University, the user may provide a student id number, a password and/or a year of graduation as authentication information. The authentication information included in the request for a credential is specified by the organization that issues the credential. The information required may be different depending on the credential-issuing organization.

The authentication information may be confirmed either by a server hosting the credential management application or by a server at the credential issuing organization. For example, the authentication information may be confirmed by comparing the authentication information provided to the server at the credential-issuing organization with authentication information for the user that was previously stored by the server at the credential-issuing organization in association with an account of the user.

In some implementations, the server that hosts the credential management application may receive the user's authentication information for Organization 1 and authorize the user to log-in to the credential management application. In some implementations, the user may exchange the authentication information directly with, and be authorized by, the credential-issuing organization itself (e.g., Organization 1 in FIG. 2), instead of with the credential management application. The credential-issuing organization (e.g., Organization 1 in FIG. 2) may then authenticate the user and, responsive to successful authentication, transmit a message to the user's client device and/or a server that hosts the credential management application, indicating that the authentication was successful and that the user should be allowed to log-in to the credential management application. Further description of different types of log-in authorization techniques is presented below in relation to FIG. 9.

Regardless of which entity processes the user's authentication information and authorizes a user to log-in to the credential management application, the credential management application enables a variety of different credential issuing organizations to issue mobile device-based credentials and/or keys through the credential management application. For example, FIG. 3 illustrates an example user interface that displays a user's credentials issued by different organizations, as a result of the user successfully logging-in to the credential management application with authentication information for Organization 1.

Figure 3:
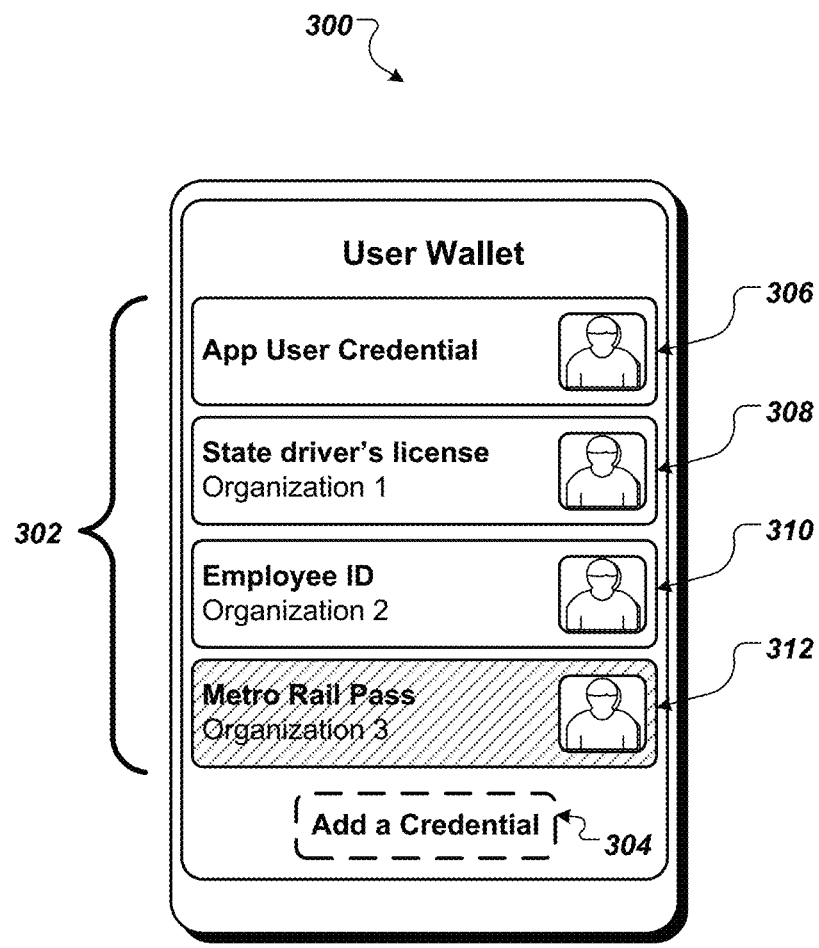

Referring now to FIG. 3, an example user interface 300 is shown that illustrates a list of the credentials 302 held by a particular user. In this example, the user interface 300 shows four user credentials for the particular user, corresponding to four different credential-issuing organizations. The user also may select the "Add a Credential" tab 304 to add new credentials to the user's account. The credentials that are displayed in the user interface 300 may either be accessible or inaccessible to the user, depending on a level of trust that each credential-issuing organization has expressed for the authentication information that the user provided to log-in to the credential management application (e.g., the username and password for Organization 1 provided to the interface 200 of FIG. 2).

In this example, the list of credentials 302 includes three accessible credentials, and one inaccessible credential. In this example, the accessibility and inaccessibility of credentials is reflected in the graphical representation of the options that correspond to the credentials (e.g., by using darker shading for options that correspond to inaccessible credentials). Option 306, which is accessible, may be selected to access credentials issued by the server that hosts the credential management application. Another accessible credential is a state-issued driver's license, selectable using option 308, issued by Organization 1, for which the user provided log-in information (e.g., using interface 200 in FIG. 2). Another accessible credential is an employee ID, selectable using option 310, issued by Organization 2. Although the user did not explicitly provide authentication information for Organization 2 in connection with this particular log-in session for the credential management application, in this example, the user is nonetheless authorized to access the employee ID credential issued by Organization 2. This may be enabled, for example, by Organization 2 having provided the credential management system with an indication of trust for Organization 1's authentication information, which the user provided to log-in to the credential management application (e.g., using interface 200 in FIG. 2).

In the example of FIG. 3, there is also a fourth credential, represented by option 312 for Organization 3, which the user does not have access to. The inaccessibility of this credential may be indicated graphically in the user interface 300 (e.g., by using darker shading for the option 312). This credential may be inaccessible to the user due to Organization 3 indicating that it will not trust the authentication information for Organization 1, which the user provided in order to log-in to the credential management application (e.g., using interface 200 in FIG. 2). The user may select one of the credentials to view the credential. For instance, when the user selects the Employee ID option 310 for Organization 2, the credential is displayed on the user's mobile device, as illustrated in FIG. 4.

Figure 4:
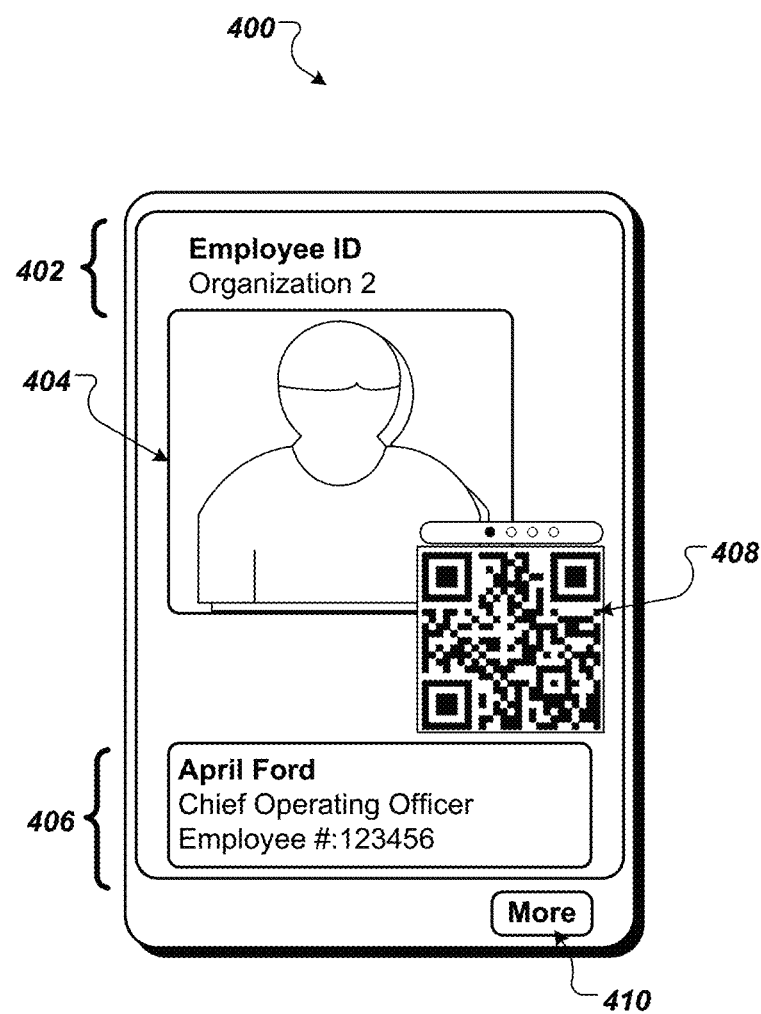

Referring now to FIG. 4, an example user interface 400 is illustrated that displays a selected credential. In this example, the selected credential is the employee ID credential that was selected using option 310 for Organization 2 in the user interface 300 of FIG. 3. The user interface 400 includes a description of the selected credential 402 and a picture 404 of the user that holds the credential. Also, the user interface 400 includes the personal information of the credential holder 406. In some implementations, some or all of the information displayed in the user interface 400 may have been provided by the organization issuing the credential, Organization 2. The interface 400 also includes a validation mechanism 408. The validation mechanism 408 may be used for validation of the user's credential by other users or entities. In the example shown in FIG. 4, the validation mechanism 408 is a Quick Reference (QR) code. Another user or entity may use a validating device to image the QR code, extract credential information encoded within the QR code, and send the extracted credential information to the credential management system (or the credential-issuing organization) for validation.

In some implementations, as an alternative or in addition to a QR code, the validation mechanism 408 may be an alphanumeric code and/or the validation mechanism 408 may be an indication that credential information is available for transmission using ultrasonic communications, near field communications (NFC), and/or other short-wavelength radio transmissions (e.g., in the ISM band from 2400-2480 MHz), for example, according to the Bluetooth standard. The user interface 400 further includes a button 410 that causes additional information about the credential to be displayed. For instance, when the user selects the button 410, the user's mobile device displays the interface 500 illustrated in FIG. 5.

Figure 5:
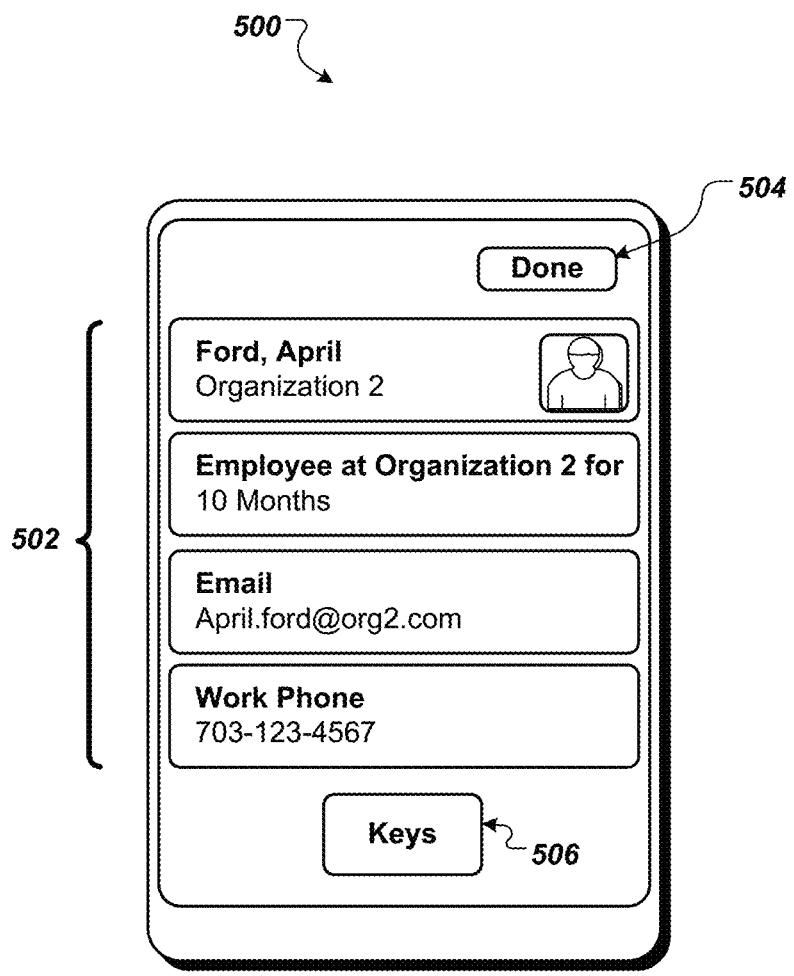

In some implementations, the user interface 400 represents a front of an employee badge and the interface 500 illustrated in FIG. 5 represents a back of the employee badge. In these implementations, when the user selects the button 410, an animation may occur that makes it appear as if the employee badge is being flipped from the front of the badge represented by the user interface 400 to the back of the badge represented by the interface 500 illustrated in FIG. 5.

Referring now to FIG. 5, an example user interface 500 is illustrated that displays additional information about a credential. In this example, the additional information corresponds to the selected credential illustrated in the user interface 400 of FIG. 4, corresponding to the employee ID of Organization 2. The interface 500 displays detailed information 502 that displays the name of the user and the name of the credential issuing organization for the particular credential, the email address of the user, the length of time the user has held the credential, the location of the office, and the phone number of the user. Some or all of the detailed information 502 displayed about the credential may be provided by the organization issuing the credential, in this case Organization 2. The user interface 500 also includes a button 504 that causes the display to return to the front of the badge or the user interface illustrated in FIG. 4. The user interface 500 also may include a button 506 that causes the user's mobile device to display any keys that have been issued to the user, in connection with the credential displayed in user interfaces 400 and 500.

When a credential-issuing organization issues a credential to a user through the credential management application, it also may issue one or more keys to the user (e.g., for the purposes of providing access to one or more physical and/or logical resources controlled by the credential-issuing organization). For example, when Organization 2 issues an employee ID to the user, it also may issue a number of keys to the user that enable the user to unlock different doors within the Organization 2 office buildings, to gain access to certain floors of the buildings from the building's elevators, to enter/exit the parking garage, etc. In some implementations, the keys are associated with access control systems that regulate access to the physical and/or logical resources and enable the physical and/or logical resources to be locked or unlocked by invocation of a control within the credential management application on the user's mobile device.

Figure 6:
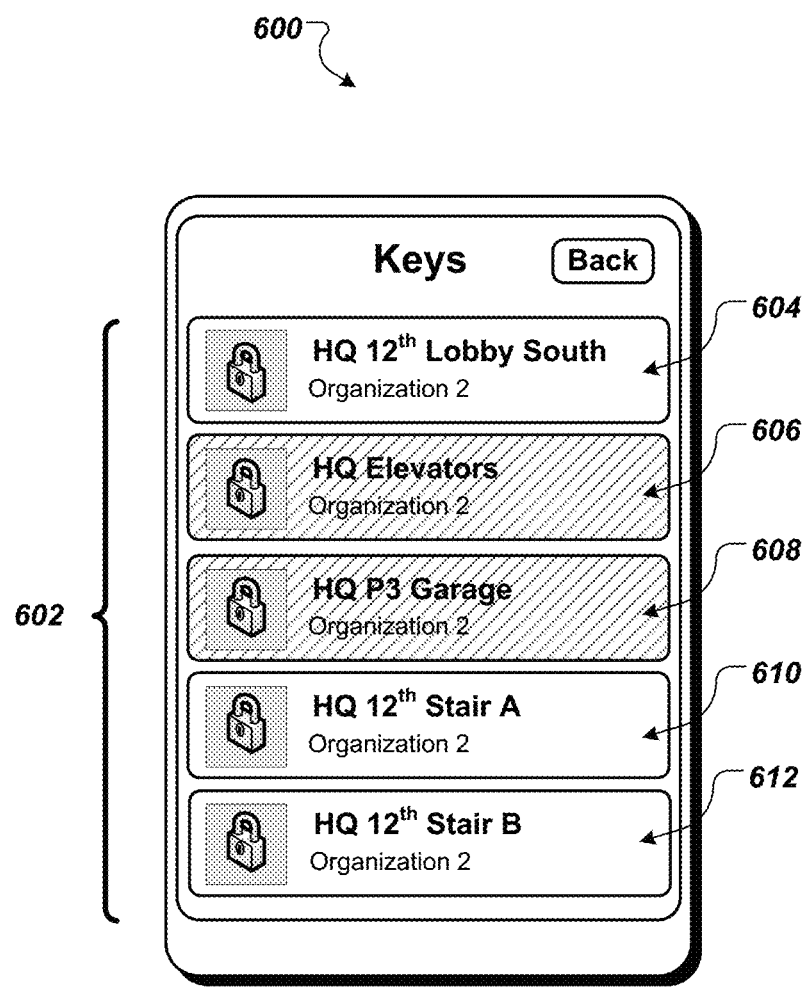

Various examples of different keys that an organization may issue to an employee as part of issuing the employee an employee credential through the credential management application are shown in FIG. 6.

Referring now to FIG. 6, an example user interface 600 is illustrated that displays a list of keys associated with a credential. In this example, the user interface 600 shows a list 602 of five keys that have been issued to the user by Organization 2. The keys enable the user to access various physical resources that are controlled by Organization 2. Some of the keys may be accessible to the user (such as the keys represented by selectable options 604, 610 and 612) while other keys may not be accessible to the user (such as the keys represented by selectable options 606 and 608, which are graphically represented in a darker shading). A key may not be accessible to a user for various reasons (e.g., the user logged-in with an organization that is not trusted by the organization that issued the key). The user also may select one of the keys to view details about the key. For instance, when the user selects the "HQ $12^{th}$ Lobby South" key, selectable by option 604, information about the key is displayed on the user's mobile device, as illustrated in FIG. 7.

Figure 7:
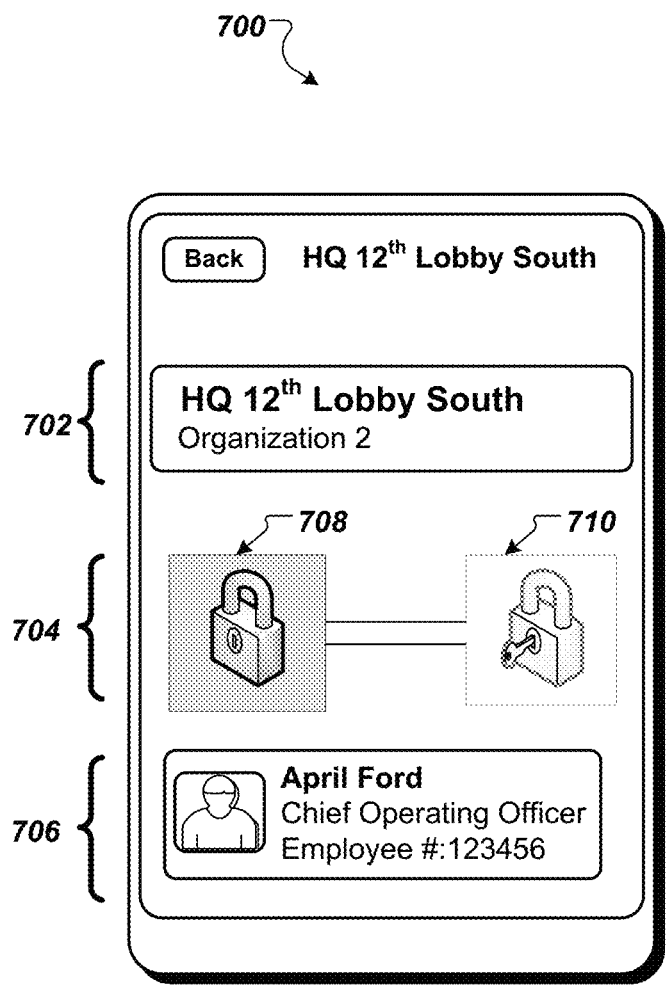

Referring now to FIG. 7, an example user interface 700 is illustrated that displays information about a selected key. The user interface 700 includes a text display 702 that describes the key and a slideable interface component 704 that enables the user to use the key to access a physical resource, in this case a door to the $12^{th}$-floor lobby of the Organization 2 headquarters. The interface 700 also may display information about the user, in text display area 706. In this example, the user may use the key to access a physical resource by sliding the key-shaped icon in the slideable interface component 704 from a "locked" position 708 to an "unlocked" position 710. Other types of interface options may be presented by interface 700 for providing access to a physical resource using the key. In this example, when the user slides the slideable interface component 704 to the unlocked position 710, then a determination may be made as to whether the user is authorized to open the corresponding door, and, if so, the door opens and a confirmation message is displayed to the user, for example by presenting the interface 800 illustrated in FIG. 8. In some implementations, the determination that the user is authorized to open the door using the key is made prior to presenting the user with the list of keys (e.g., in user interface 600 of FIG. 6).

Figure 8:
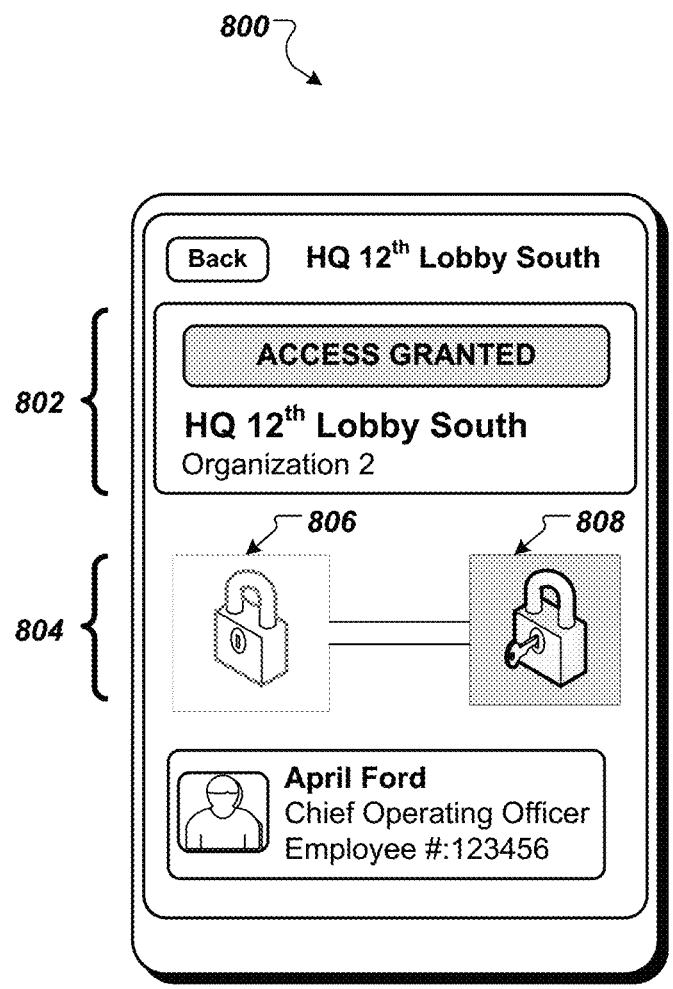

Referring now to FIG. 8, an example user interface 800 is illustrated that displays an indication that a physical resource has been unlocked using a key and is accessible to the user. In this example, a display interface component 802 may be provided indicating that Organization 2 has authorized the user to open the door to HQ $12^{th}$ Lobby South.

The access of a physical resource using a key can be enabled by any suitable technique. For example, a user's mobile device may use short-range wireless communication signals, such as infrared (e.g., Bluetooth) or near-field communication (e.g., NFC) signals to access a physical resource by placing the mobile phone in close proximity to the physical resource. As another example, the mobile device may access a physical resource indirectly via an intermediate device, such as a relay or a router. Additionally or alternatively, the mobile device may use a wireless network communication signal (e.g., Wi-Fi, cellular, etc.), to access a physical resource over a communication network. For example, the mobile device may send control signals to the credential-issuing organization via wireless communication (either directly or via the server system), which may then, in turn, control the physical resource. In some implementations, the mobile device may use an attached device, such as a dongle, to facilitate access of the physical resource. These are merely some examples of techniques that can be used by a mobile device to access a physical resource as a result of a user of the mobile device attempting to use a key to access the physical resource, and other techniques may be used.

The example user interfaces of FIGS. 1-8 illustrate a user logging into a credential management application using authentication information for one organization (e.g., Organization 1 in FIG. 2) and, as a result, being able to access credentials and keys issued by another organization (e.g., Organization 2 in FIGS. 4-8). When a credential-issuing organization (e.g., Organization 2) issues a credential to a user, the credential-issuing organization may specify other credential-issuing organizations (e.g., Organization 1) that the credential-issuing organization trusts to authenticate the user such that, if the user is authenticated by any of the specified other credential-issuing organizations, the credential-issuing organization indicates that the user should be enabled to use the credential and/or other related resources (e.g., keys) issued by the credential-issuing organization.

For example, continuing with the example of the user and credentials discussed above in connection with FIGS. 1-8, when Organization 1 issued the user a credential (e.g., the state driver's license represented by option 308 of FIG. 3), Organization 1 (which may be a governmental organization) may have specified that the user only be allowed to access the user's state driver's license (and/or other related resources for Organization 1) if the user logged-in to the credential management application by authenticating him/herself with Organization 1. Consequently, if the user logsin to the credential management application using other authentication information, the user may not be able to access the user's government-issued driver's license (and/or other related resources) issued by Organization 1. In such cases, an indication that the user holds a credential (and/or other related resources) from Organization 1 may be presented to the user in a manner that indicates that the user should log-in using the user's Organization 1 authentication information in order to access the user's Organization 1 credential (and/or other related resources).

Continuing with this example, when Organization 2 issued the user a credential, Organization 2 may have specified that the user is allowed to access the user's Organization 2 credential (e.g., the employee ID represented by option 310 of FIG. 3) if the user logged-in to the credential management application by authenticating him/herself with either Organization 2, with the credential management application, or with Organization 1. Consequently, even if the user logged-in to the credential management application by authenticating him/herself with Organization 1 (e.g., a governmental organization), the credential management application still may enable the user to access the user's Organization 2 credential (e.g., an employee ID in FIGS. 4-5) and/or other resources (e.g., the accessible keys in FIG. 6).

Further, Organization 2 may customize which of its issued credentials and/or keys are made available to the user as a result of the user logging-in with authentication information for Organization 1. For example, Organization 2 may specify that some of the keys issued to the user are inaccessible to the user (e.g., the keys indicated by shaded options 606 and 608 in FIG. 6) as a result of the user logging-in with Organization 1, while some of the keys issued to the user are accessible to the user (e.g., the keys indicated by un-shaded options 604, 610, and 612 in FIG. 6). As such, the user may be able to access credentials and/or keys from other organizations by providing authentication information for a particular organization, without necessarily being required to open separate log-in sessions for each of the other organizations.

In some implementations, a user of the credential management application may specify further restrictions for enabling access to credentials and/or keys from a mobile device. For example, the user may specify that Organization 2 should never provide credentials or keys to a mobile device operated by the user as a result of a user logging-in to the credential management application with authentication information for Organization 1, even if Organization 2 has indicated that it trusts Organization 1's authentication information. Such user-defined restrictions may be desired by a particular user, for example, if other users have access to the particular user's authentication information for Organization 1 (e.g., a username and password for the Department of Motor Vehicles) on the particular user's mobile device, and the particular user wants to restrict usage by the other users of the credentials and/or the keys for Organization 2 (e.g., access to opening a secured door to a private office).

Figure 9:
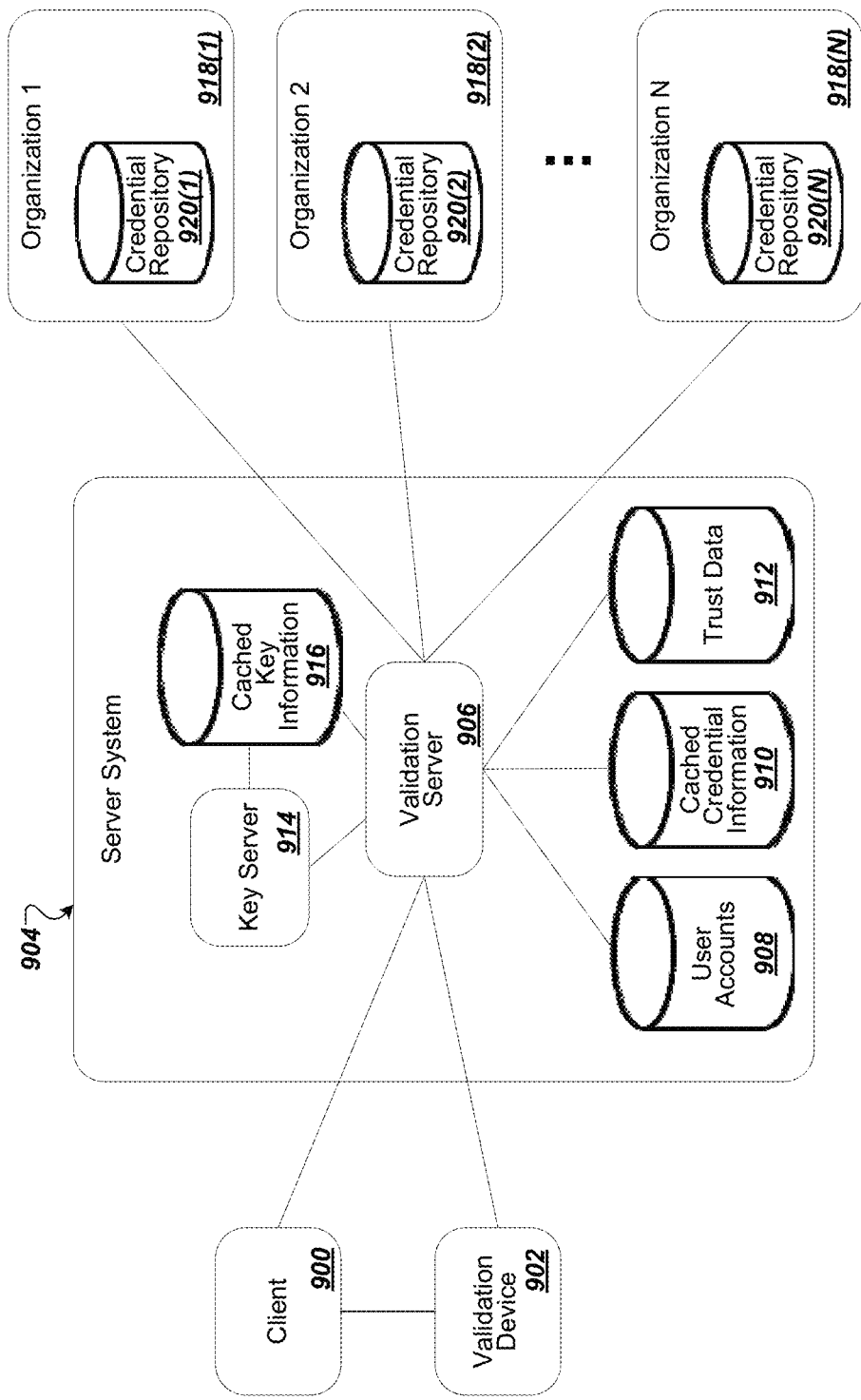
FIG. 9 is a diagram illustrating an example of a credential management system.

Referring now to FIG. 9, an example credential managing system is illustrated. In this example, the system includes a client device 900, a validation device 902, and a server system 904. The client device 900 operates a mobile device-based credential management application. The validation device 902 may be any device that, for illustrative and exemplary purposes, is used to validate a credential and/or key of a user of client device 900. The client device 900 may include any electronic device that is capable of communicating with the server system 904 including, but not limited to, a mobile phone, smart phone, personal digital assistant (PDA), electronic book (e-book) reader, tablet computer, laptop, or other device that includes one or more processors and non-transitory computer readable storage media. The credential management application that is installed on the client device 900 is in communication with the server system 904. The credential management application acts as a platform for managing credentials and related resources (e.g., keys) issued to multiple, different users by various credential-issuing organizations.

The server system 904 includes a validation server 906, a user account data store 908, a credential data store 910, a trust data store 912, and a key data store 916. The validation server 906 is involved in the process of validating credential issuing organizations as well as validation of credentials and/or keys. The validation server 906 authenticates credential issuing organizations that would like to make credentials and/or keys available to users of the credential management application. The validation server 906 also validates credentials and/or keys held by users of the credential management system through communication with credential management applications operated on user devices, such as client device 900.

The user account data store 908 stores user account information, the credential data store 910 stores credential information associated with user accounts, the trust data store 912 stores trust rules provided by credential-issuing organizations and/or restrictions specified by the user to govern the provisioning of credentials and/or keys on the mobile device 900, and the key data store 916 stores keys associated with the credentials. Users of the credential management application may set up a user account that allows the user to store personal information as well as the credentials and related resources (e.g., keys) issued to the user. Each user account may include identification information for the user and credential/key data that defines credentials and/or keys held by the user. The server system 904 may maintain accounts for multiple different users with each user account specific to a user, as well as maintain the credentials and/or keys held by the specific user.

The validation server 906 is in communication with the user account data store 908, the credential data store 910, the trust data store 912, and the key data store 916, for example, to manage and validate credentials and related resources (e.g., keys). The validation server 906 authenticates and establishes connections with various trusted credential-issuing organizations, such as Organization 1, Organization 2, . . . , Organization N that operate systems 918(1), 918(2), . . . , 918(N), respectively, as shown in FIG. 9. The number of credential-issuing organizations N can be any suitable positive integer. The server system 904 may use a variety of information and techniques to communicate with the credential issuing organization systems 918(1)-918(N). For instance, the server system 904 may use an electronic address (e.g., a uniform resource locator (URL)) to communicate with the credential issuing organizations 918(1)-918(N) and a set of guidelines that govern a format for exchanging communications between the credential issuing organization systems 918(1)-918(N) and the server system 904.

As shown in FIG. 9, the validation server 906 establishes multiple, different connections with multiple, different credential issuing organization systems 918(1)-918(N). The credential-issuing organizations may include one or more universities, one or more companies, and one or more government agencies, among other organizations. One or more of the credential issuing organization systems 918(1)-918(N) may maintain a credential repository (e.g., credential repositories 920(1)-920(N)) on systems 918(1)-918(N).

A user may log-in to the credential management application using authentication information for one of the N credential-issuing organizations, for example, by using authentication information for Organization 1. In some implementations, the server system 904 may receive the authentication information and determine that the user has been authorized by Organization 1, for example, by determining that the user's authentication information has been validated by Organization 1 (as described in more detail below in relation to FIG. 10). Additionally or alternatively, the user's authentication information for Organization 1 may be authenticated with Organization 1, and Organization 1 may transmit an indication to the server system 904 that the user's authentication information has been authorized by Organization 1.

As a result of determining that the user has been authorized by Organization 1, the server system 904 may enable the user to use one or more credentials and/or keys issued by Organization 1. In addition, as a result of determining that the user has been authorized by Organization 1, the server system 904 may enable the user to use one or more credentials and/or keys issued by other credential-issuing organizations, such as Organization 2.

For example, the client device 900 may attempt to use credentials and/or related resources (e.g., keys) from the credential issuing organization system 918(2), operated by Organization 2. The validation server 906 sends a request to the credential-issuing organization system 918(2) for credential information of a user of the client device 900. The credential-issuing organization system 918(2) accesses data from the credential repository 920(2) and provides credential information from the accessed data to the validation server 906. In some implementations, a credential-issuing organization system 918(2) may transmit the credential information to the server system 904 in a specific format specified by the server system 904. For example, the credential-issuing organization system 918(2) may transmit the credential information to the server system 904 as a JavaScript Object Notation (JSON) object. Additionally or alternatively, the credential information may have certain fields to be filled by the credential-issuing organization system 918(2) as specified by the server system 904. The fields may include group name, user name, title of credential or badge title, expiration date, cache until date, and an extra field. The credential information also may include additional information. Such additional information may be communicated as encryption key-value pairs or it may be communicated as binary data or any other suitable data format. Additional information may include a photo of the user, or the logo of the credential-issuing organization.

After receiving the credential information from the credential-issuing organization system 918(2), the server system 904 may add one or more credentials and/or related resources (e.g., keys) to the user's account based on the received credential information. For example, the server system 904 may identify an account associated with the user and associate, with the account, one or more credentials and/or keys defined by the credential information. In this example, the server system 904 may store the credential information in association with the account of the user or the server system 904 and may store other information representing the one or more credentials or keys defined by the credential information.

The validation server 906 may have accessed, at any suitable time, the trust data store 912 to determine that the user should be enabled to use the credential and/or key from Organization 2, based on trust rules established by Organization 2 and/or by a user of the client device 900. The trust data may indicate that Organization 2 trusts the authorization of the user by Organization 1, and is willing to make one or more of its credentials and/or keys accessible to the user as a result of the user being authorized by Organization 1. Based on the accessed trust data, the validation server 906 provides credential information for Organization 2 to the client device 900 for display through the credential management application to the user.

In some examples, after a credential and/or key is added to a user's account, the server system 904 may sign the added credential and/or key and pass the added credential and/or key to the user device, where the added credential and/or key is displayed by the mobile credential management application with the list of credentials and/or keys associated with the account of the user. In these examples, some or all of the credential information for each of the credentials and/or keys associated with the account of the user is stored at the client device by the mobile credential management application. Accordingly, the mobile credential management application is able to display the list of credential and/or keys without communicating with the server system.

In some implementations, credential information is not stored at the client device and the user may be required to retrieve credentials and/or keys from the credential-issuing organization each time the user selects to view a list of credentials and/or keys. In these implementations, the user may be required to go through the entire authentication process each time the user selects to view the list of his/her credentials and/or keys.

In some examples, the server system 904 may store cached versions of the credentials and/or keys and may retrieve credentials and/or keys from storage (e.g., from the cached credential data store 910 or from the cached key data store 916) to display when the user selects to view a list of credentials and/or keys at the mobile credential management application. In these examples, the mobile credential management application communicates with the server system 904 to display the list of credentials and/or keys, but the user is not required to go through the entire authentication process to view the list of credentials and/or keys. Where a cached version of a credential and/or key is stored by the server system 904, the server system 904 may periodically request updated versions of the credential and/or key from the credential-issuing organization to ensure that the version of the credential and/or key that is displayed to the user is the most current version and that the credential and/or key has not been revoked by the credential-issuing organization.

Credentials and/or keys issued to a user by a credential-issuing organization may be cached (e.g., in the cached credential data store 910 or in the cached key data store 916) for a specified period of time (e.g., until a cache-until-date associated with the credential or key). The cache-until-date, for example, defines a date until which a cached version of the credential or key may be provided to the user without the server system having to communicate with the credential-issuing organization to confirm the continued validity of the credential or key. As an example, when the cache-until-date for a credential has not passed, the server system 904 may access, from electronic storage at the server system 904, a cached version of the credential and use the cached version of the credential to send the credential (e.g., send a user an updated list of the user's credentials) or validate the credential (e.g., confirm to another user that the user's credential is valid). When the cache-until-date for the credential has passed, the server system 904 communicates with the credential-issuing organization that issued the credential to receive updated credentials. For example, an employer may define a cache-until-date corresponding to twenty-four hours from time of issuance for an employee credential issued to an employee by the employer. In this example, if the server system 904 has received information for the employee credential from the employer's system less than twenty-four hours prior to the employee's attempted use of the credential (e.g., presentation of the credential to gain access to the employer's building), the server system 904 may validate the use of the employee credential without having to communicate with the employer's system. If not, the server system 904 communicates with the employer's system to receive updated credential information for the employee credential and validates the use of the employee credential based on the updated credential information for the employee credential.

Credentials and/or keys also may be associated with an expiration date. When a credential or key is associated with an expiration date, the credential or key may be stored by the server system 904 until the expiration date. For instance, when the server system 904 determines that the expiration date of a credential has passed, the server system 904 may delete the data defining the expired credential and remove the expired credential from the user's account.

The server system 904 may, in some implementations, refresh one or more credentials and/or keys for a user. For example, the server system 904 may refresh a credential for any appropriate reasons, such as in an effort to have an up-to-date version of the credential available to the client device through the credential management application. Refreshing a credential or key may include sending updated credential information to the client device 900, which the client device 900 may display and/or store. Refreshing one or more credentials or keys may occur based on actions taken by the user through the credential management application, such as providing input to display a current version of a particular credential or key or a current version of a list of credentials or keys held by the user. Credentials or keys stored on the client device 900 also may be periodically refreshed (e.g., daily, weekly, etc.) by the server system 904 so that the credential information stored on the client device 900 is reasonably up-to-date.

There may be various different triggers that cause the server system 904 to determine to refresh one or more credentials and/or keys. For example, in some implementations, the server system 904 may determine to refresh a credential based on a cache-until-date associated with the credential expiring. For example, an employee badge may have a cache-until-date of one week. At the end of the week, the server system 904 may determine to refresh the badge to determine if a newer version of the badge is available. Additionally or alternatively, the server system 904 periodically may determine to refresh a credential or key to ensure that the credential or key still is valid and has not been revoked by the credential-issuing organization that issued the credential or key. The server system 904 also may determine to refresh a credential or key in response to receiving a request to access the credential or key from the user to whom the credential or key was issued and/or in response to a request to validate the credential or key.

A user may add credentials and/or keys from more than one credential-issuing organization to his/her user account. For example, the user may wish to add a degree from a University, as well as an employee badge from his/her place of employment. In this example, the multiple credentials may be added in multiple, separate requests to add the credentials. In some implementations, a credential-issuing organization may provide several types of credentials to a user such that the user's account includes multiple, different credentials issued by the credential-issuing organization to the user. Additionally or alternatively, a user may receive credentials (and related resources, such as keys) from several different credential-issuing organizations such that the user's account includes at least a first credential (and related resources) issued by a first organization and a second credential (and related resources) issued by a second organization. The credential management system may maintain accounts for many different users, and may manage credentials and keys issued to these users by many different organizations.

Figure 10:
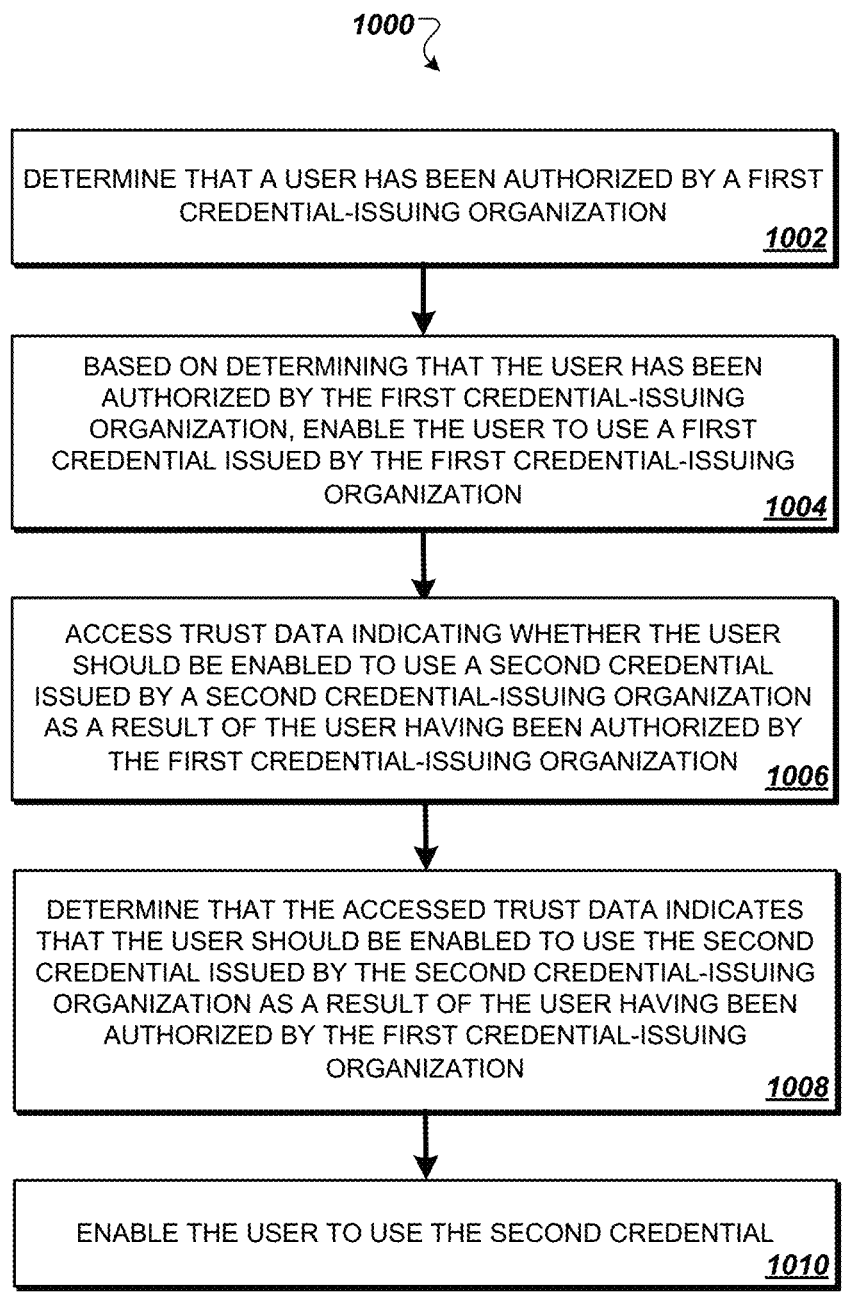
FIGS. 10-14 are flowcharts illustrating example processes for enabling use of credentials.

Referring now to FIG. 10, an example process 1000 is illustrated for managing credentials. The operations of the process 1000 are described generally as being performed by a server system, such as the server system 904 in FIG. 9. The operations of the process 1000 may be performed by one of the components of the server system 904 (e.g., the validation server 906) or may be performed by a combination of the components of the server system 904. In some implementations, operations of the process 1000 may be performed by one or more processors included in one or more electronic devices.

The server system 904 determines that a user of a client device 900 has been authorized by a first credential-issuing organization (e.g., Organization 1) (1002). In some implementations, this may comprise receiving, from a device 900 of the user, first authentication information that is associated with Organization 1 and that identifies the user and accessing a user account for the user, wherein the user account is maintained by the server system 904. The server system 904 may then determine, based on accessing the user account, that the first authentication information was validated by the first credential-issuing organization system 918(1) operated by Organization 1. The authentication information may be, for example, a username and password (e.g., as provided in user interface 200 of FIG. 2), or may be any other suitable authentication information that the user has registered with the first credential-issuing organization system 918(1).

In some implementations, determining that the user has been authorized by the first credential-issuing organization system 918(1) comprises receiving, at the server system 904 and from the first credential-issuing organization system 918(1), a message indicating that the user has been authorized by the first credential-issuing organization system 918(1). For example, in some implementations, a user's authentication information for Organization 1 may be sent directly to Organization 1 by the user's mobile device (e.g., client device 900 in FIG. 9) and after successful authentication by Organization 1, an indication that the user's authentication information has been authenticated may be communicated to the server system 904, e.g., by Organization 1 directly and/or via the user's client device 900.

Based on determining that the user has been authorized by the first credential-issuing organization system 918(1), the server system 904 may enable the user to use a first credential issued by the first credential-issuing organization (1004). The server system 904 may use a variety of techniques to enable the user to use the first credential, such as providing the credential from a cached credential store, or by requesting the credential from the credential-issuing organization.

In some implementations, as a result of the user having been authorized by the first credential-issuing organization system 918(1), the user also may have access to credentials and/or keys issued by other credential-issuing organizations (e.g., Organization 2 in FIGS. 3-8). For example, the server system 904 may access trust data indicating whether the user should be enabled to use a second credential issued by a second credential-issuing organization system 918(2) as a result of the user having been authorized by the first credential-issuing organization system 918(1) (1006).

The server system 904 may determine that the accessed trust data indicates that user should be enabled to use the second credential issued by the second credential-issuing organization system 918(2) as a result of the user having been authorized by the first credential-issuing organization system 918(1) (1008). The server system 904 may then enable the user to use the second credential (1010). In some examples, the server system 904 may enable the user to use the second credential even if the user did not log-in to the credential management application using authentication information for Organization 2 in connection with the attempt to use the second credential. The trust data may indicate that the authorization of the user by Organization 1, operating the first credential-issuing organization system 918(1), is sufficient to enable the user to use the second credential issued by Organization 2.

The server system 904 may use a variety of techniques to enable the user to use a credential (e.g., the first credential in 1004 or the second credential in 1010). In some implementations, the credential may have already been provided to the server system 904 by a credential-issuing organization, and may be cached in the server system 904. In such scenarios, enabling the user to use the credential issued by the credential-issuing organization comprises determining that the credential has already been received, at the server system 904 and from the credential-issuing organization, accessing the received credential from a user account of the user, and providing the credential to the client device 900 of the user. In some implementations, the credential may not have been cached, or may need to be renewed, at the server system 904. In such scenarios, enabling the user to use the credential issued by the credential-issuing organization comprises determining that the credential has not been received at the server system 904 from the credential-issuing organization, and providing, to a system operated by the credential-issuing organization, identifying information for the user. The server system 904 may then receive, from the credential-issuing organization, the credential and add the credential to a user account of the user. In some implementations, the server system 904 may then provide the credential to the device 900 of the user.

The trust data may include various types of information regarding enabling a user to use credentials and/or keys issued by different organizations, based on the particular organization that authorized the user to log-in to the credential management application. In some implementations, the trust data may include a list of organizations (described in more detail below in relation to FIG. 11). The list of organizations may indicate organizations that trust the particular organization (e.g., the organizations that enable the user access to their credentials and/or keys as a result of the user having been authorized by the particular organization). The list of organizations may indicate organizations that are trusted by another organization (e.g., the other organization enables the user access to its credentials and/or keys as a result of the user having been authorized by any of the organizations in the list).

Additionally or alternatively, the trust data may include one or more conditions that should be satisfied by a particular organization in order for the particular organization to be considered a trusted credential-issuing organization by other organizations (described in more detail below in relation to FIG. 12).

Figure 11:
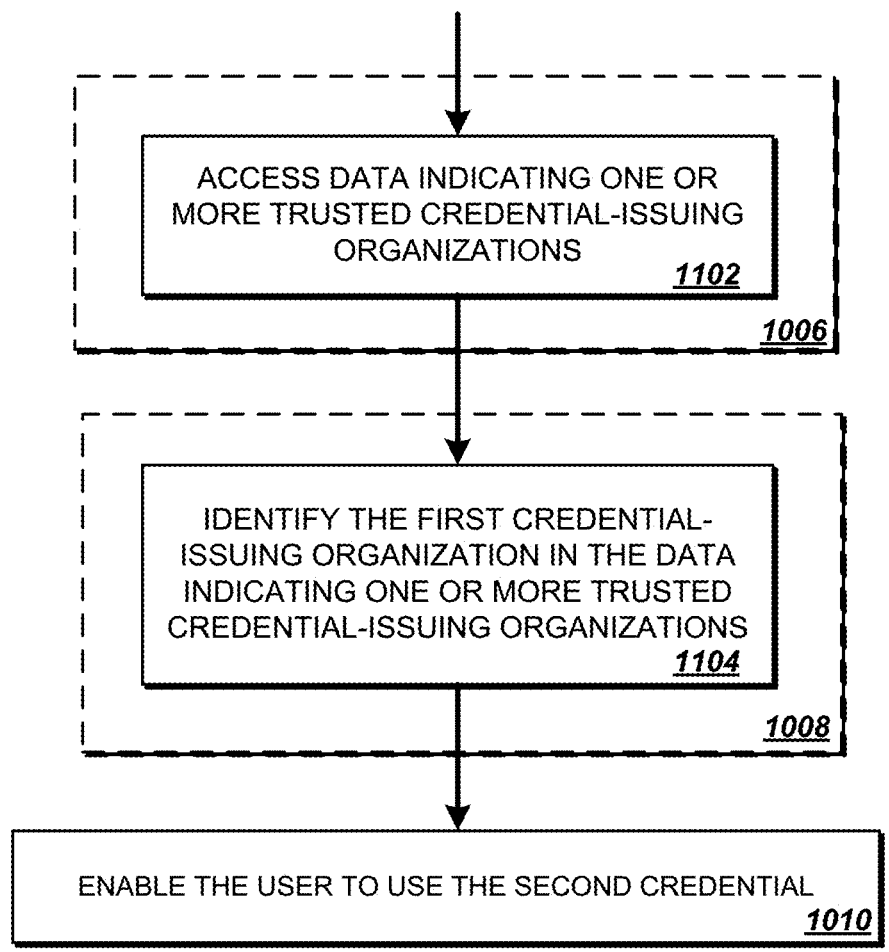

Referring now to FIG. 11, an example process is illustrated of further details of accessing trust data (e.g., 1006 in FIG. 10) and determining that a user should be enabled to use a second credential issued by a second credential-issuing organization as a result of the user having been authorized by the first credential-issuing organization (e.g., 1008 in FIG. 10). The trust data may include any suitable type of data indicating trust relationships between credential-issuing organizations. In some implementations, the trust data includes a list of trusted credential-issuing organizations. In such scenarios, the server system 904 may access data (e.g., a list) indicating one or more trusted credential-issuing organizations (1102) and identify the first credential-issuing organization (e.g., Organization 1) in the data indicating one or more trusted credential-issuing organizations (1104). The list of organizations trusted by Organization 2 may be specifically provided by Organization 2, or may be provided by an entity other than Organization 2 (e.g., a third party that performs audits of security performance for credential-issuing organizations).

In some implementations, the trust data (e.g., a list of organizations) may include different tiers or ratings of organizations. For example, identifying that Organization 1 is in the list of trusted organizations may comprise determining the tier or rating for Organization 1 within the list. The tier or rating of a particular organization may indicate, for example, a level of trust that other organizations have expressed for the particular organization's authorization of a user. As an example, the particular organization may be classified in one of three possible tiers or ratings: "Trusted" (e.g., indicating that other organizations will enable a user access to both credentials and keys issued by the other organizations as a result of the user having been authorized by the particular organization), "Partially Trusted" (e.g., indicating that other organizations will enable a user access to only credentials but not keys as a result of the user having been authorized by the particular organization), and "Not Trusted" (e.g., indicating that other organizations will not enable a user access to credentials nor keys as a result of the user having been authorized by the particular organization). In general, any number of tiers or ratings may be used, corresponding to any trust settings. The tier or rating to which a particular organization belongs may be established by any technique. For example, tiers or ratings may be based on one or more conditions that should be satisfied by a credential-issuing organization in order to be classified in particular tiers or ratings.

Figure 12:
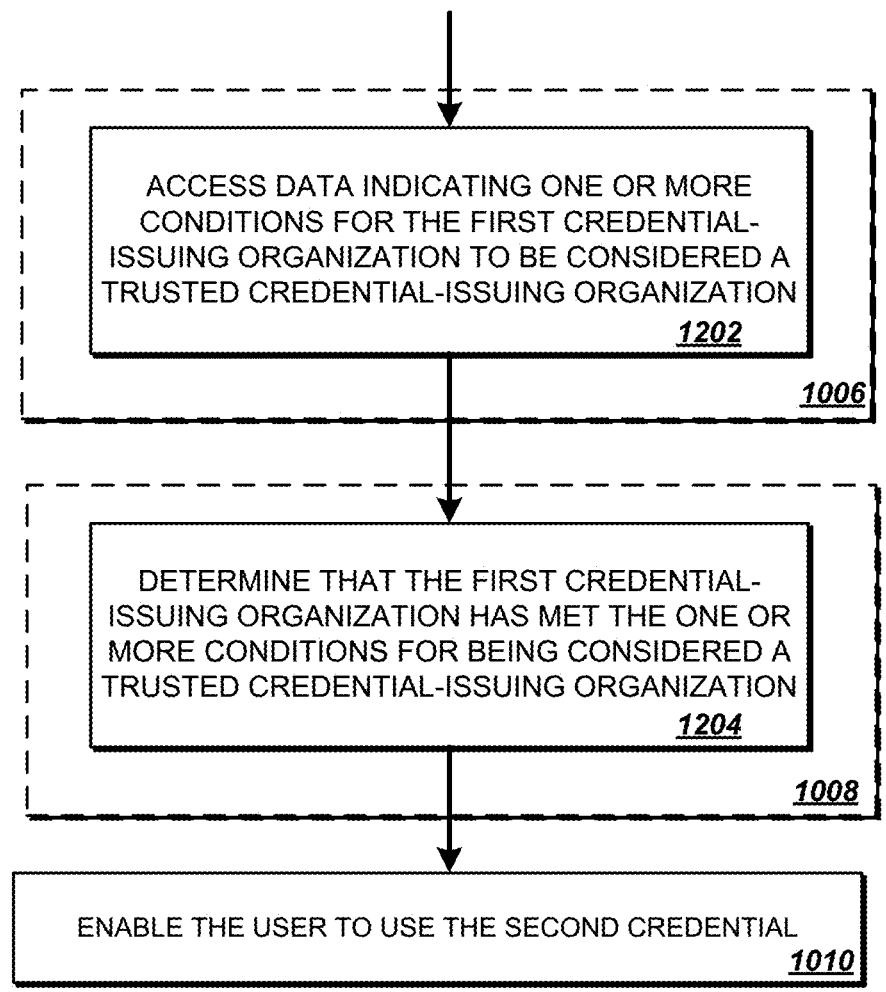

Referring now to FIG. 12, an example is illustrated of further details of accessing trust data (e.g., 1006 in FIG. 10) and determining that a user should be enabled to use a second credential issued by a second credential-issuing organization as a result of the user having been authorized by the first credential-issuing organization (e.g., 1008 in FIG. 10). For example, Organization 2 may specify one or more conditions that must be satisfied by another credential-issuing organization (e.g., Organization 1) in order for authentication information for Organization 1 to be trusted by Organization 2, and for the server system 904 to provide credentials and/or keys issued by Organization 2 to the user. In such scenarios, the server system 904 may access data indicating one or more conditions for the credential-issuing organization to be considered a trusted credential-issuing organization (1202). The conditions may require, as examples, that Organization 1 perform a re-authentication action for the user (e.g., selecting a new password) with sufficient frequency (e.g., every day, every week, every month, etc.) and/or at a sufficiently recent time (e.g., within the past 24 hours, within the past week, within the past month, etc.), or have sufficiently stringent requirements on the security of the authentication information (e.g., a minimum length of password). The server system 904 may then determine that the first credential-issuing organization has met the one or more conditions (1204) and enable the user to use the second credential (1010).

In addition or as an alternative to trust data specified by credential-issuing organizations (e.g., stored in trust data store 912 of FIG. 9), the server system 904 may also have available user-defined restrictions for providing the device of the user with credentials and/or keys issued by an organization as a result of the user having been authorized with authentication information from other organizations. An example of applying user-defined restrictions is described below in relation to FIG. 13.

Figure 13:
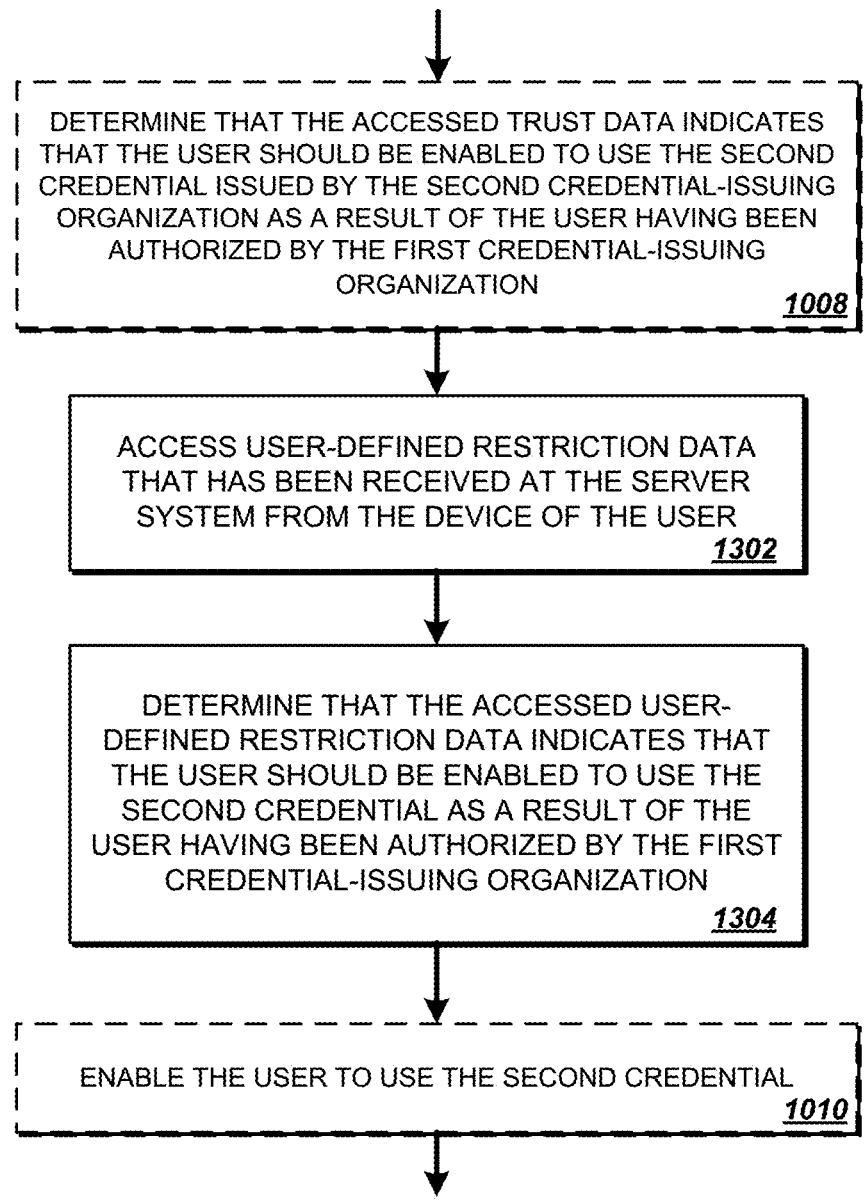

Referring now to FIG. 13, an example is illustrated of further details of applying user-defined restrictions to manage credentials. In some implementations, after having determined that the trust data indicates that the user should be enabled to access the second credential as a result of the user having been authorized by the first credential-issuing organization (1008), the server system may access user-defined restriction data that was received, for example, from the device of the user (1302). The user-defined restriction data for a particular credential-issuing organization may have been received at any suitable time, such as when the user first set up an account for the credential-issuing organization or at any time thereafter when the user updated the account. In addition, the accessing of the user-defined restriction data can be performed at any suitable time, such as before the server system 904 accesses the trust data in 1008. The user-defined restriction data may further restrict the one or more conditions or the list of trusted organizations indicated by the organization-defined trust data. These user-defined restrictions may be stored by the server system 904 with the user's account (e.g., in the user accounts data store 908 in FIG. 9) or in any suitable storage medium.

The specific manner of applying the user-defined restrictions in conjunction with the trust data may depend on the preferences of the user and/or the credential-issuing organizations. In some implementations, user-defined restrictions may further restrict and supersede the organization-defined trust data. Still in reference to FIG. 13, as an example, the server system 904 may determine that the received user-defined restriction data indicates that the user should be enabled to use the second credential as a result of the user having been authorized by Organization 1 (1304). In this example, as a result of having permission from both the trust data and the user-defined restriction data, the server system 904 may enable the user to use the second credential.

Alternatively, in another scenario, even if the trust data indicates that a user should be enabled to access a credential, the server system 904 may nonetheless restrict the user's access to the credential based on user-defined restriction data. For example, assume that the server system 904 has determined that the accessed trust data indicates that the user should be enabled to use a third credential issued by a third credential-issuing organization (e.g., Organization N in FIG. 9) as a result of the user having been authorized by the first credential-issuing organization (e.g., Organization 1 in FIG. 9). The server system 904 further may determine that the received user-defined restriction data indicates that the user should not be enabled to use the third credential, even though the user has been authorized by Organization 1. As a result, the server system 904 may provide an indication to the device of the user that the user is not enabled to use the third credential. Such a restriction may be imposed by a particular user for a number of reasons. For example, in the scenario that multiple users have access to a credential issued by an organization (e.g., a family health insurance card issued to all members of a particular household by a healthcare provider organization) on the particular user's client device, the particular user may not want those other users to also have access to the particular user's credentials or keys for another organization (e.g., an employee ID badge or access to an office in a secured office building), even if the other organization itself has expressed trust for the healthcare provider's authorization of the user's authentication information on the client device.

Other techniques may be used to further restrict the provisioning of credentials and/or keys to users. For example, in some implementations, the server system may use geographic location information of a user's device to determine whether the user should be enabled to use credentials and/or keys from a credential-issuing organization, as described in more detail in the example of FIG. 14 below.

Figure 14:
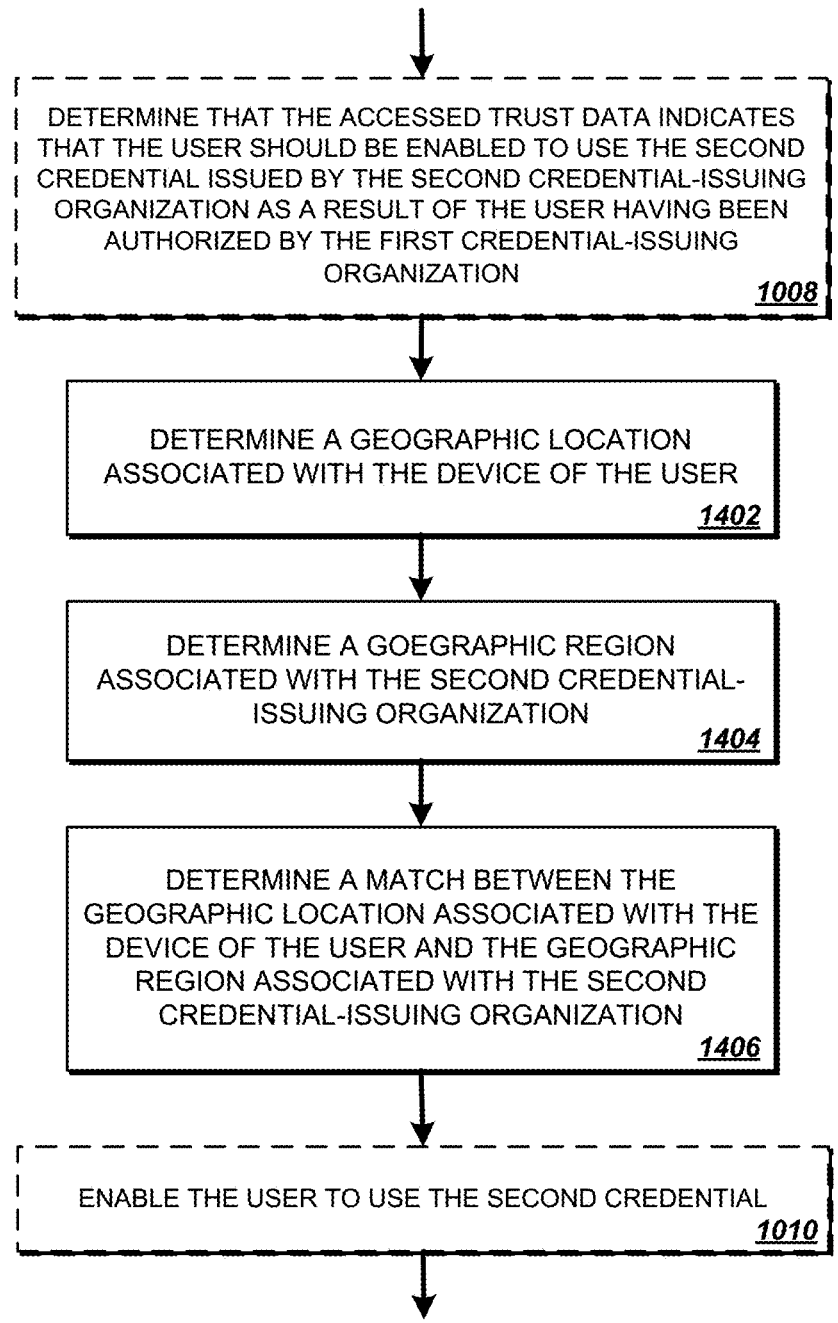

Referring now to FIG. 14, an example is illustrated of further details of applying geographic location information to manage credentials. In some implementations, after having determined that the trust data indicates that the user should be enabled to access the second credential as a result of the user having been authorized by the first credential-issuing organization (1008), the server system may determine a geographic location associated with the device of the user (1402). The geographic location may be determined by any suitable technique (e.g., by receiving an indication of geographic location from the user's device, or by determining the user's location based on wireless triangulation, or by receiving the user's location from a third party, etc.), and at any suitable time (e.g., before determining that the trust data indicates that the user should be enabled to use the second credential in 1008).

The server system 904 further may determine a geographic region associated with the second credential-issuing organization (1404). The server system 904 then may determine whether the user is in proximity to the second credential-issuing organization before enabling the user to use the second credential. This may help reduce occurrences of fraud in which unauthorized users attempt to access credentials and/or may help reduce occurrences of error in which the user inadvertently attempts to access a credential for an unintended organization. In the example of FIG. 14, the server system 904 determines a match between the geographic location associated with the device of the user and the geographic region associated with the second credential-issuing organizations (1406). The server system then proceeds to enable the user to use the second credential (1010).

In some implementations, the location of a user's device may also be used to suggest nearby credential-issuing organizations for which the user may be enabled to use credential. For example, as a user approaches an organization's office building, if the user holds a credential for the organization but is not logged-in to the credential management application, the application may determine that the user is nearing the organization's office building (or other associated location) and, consequently, may suggest that the user log-in to the credential management application using the user's authentication information for that organization. As such, the application may reduce the need for a user to search for the appropriate organization, log-in with the organization, and find his or her credentials.

Similar geo-location-based credential management techniques can be applied to resources associated with credentials, such as keys. For example, the server system 904 may determine whether a user who is requesting to use a key for a physical resource is located within a proximity of the physical resource before enabling the user to use the key. Additionally or alternatively, the server system 904 may determine that the user is approaching a particular physical resource and may suggest using an appropriate key for the physical resource. Such techniques may be performed, for example, by the validation server 906 in the server system 904. By using a variety of types of data, such as geo-location data, to manage a variety of credentials and keys that were issued by different organizations, the application may facilitate a user's experience in using credentials and keys.

Referring now to FIG. 15, an example data structure 1500 is illustrated for storing trust data. The data structure 1500 may be used by the server system 904 to store trust data for each of the multiple, different credential-issuing organizations that have issued credentials and other resources (e.g., keys) to a user. The data in the data structure 1500 may be provided to the server system by the different credential-issuing organizations or by an appropriate third party that manages trust data.

The data structure 1500 includes a first column 1502 for credential-issuing organizations that have specified trust levels for other organizations. For the example shown in FIG. 15, there are N different credential-issuing organizations that have specified trust levels, corresponding to N rows, where N is any appropriate positive integer. The first row 1504 indicates the various levels of trust that have been specified by Organization 1 for other credential-issuing organizations. In this example, Organization 1 has specified that it trusts all other organizations, i.e., that it will enable a user to access its credentials and keys as a result of a user having been authorized by any of the other N organizations (indicated by the "trusted" status of all credentials and keys in the first row 1504). The second row 1506 indicates the various trust levels that have been specified by Organization 2. In this example, Organization 2 has specified varying levels of trust for its credentials and keys based on the organization that authorizes a user. For example, Organization 2 has specified, as reflected in the second column 1510 of row 1506, that it will enable a user to use its credential and three of its five keys as a result of the user having been authorized with Organization 1 (e.g., as shown in the user interfaces 300 and 600 of FIGS. 3 and 6).

Continuing with the example of FIG. 15, the last row 1508 indicates the various trust levels that have been specified by Organization N. In this example, Organization N has specified that it will not trust any other organization and will only enable a user to access its credentials and keys if the user has been authorized by Organization N (as indicated in column 1512 of row 1508). In this example, Organization N also may be a "universally trusted" organization, in that all the other organizations enable a user to use their credentials and keys as a result of the user having been authorized by Organization N (as indicated by the "trusted" status for all credentials and keys in column 1512).

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   determining, by a server system, that a user has been authorized by a first credential-issuing organization;
   based on determining that the user has been authorized by the first credential-issuing organization, granting, by the server system, access to a user device of the user to use a first credential issued by the first credential-issuing organization for the user;
   accessing, by the server system, trust data indicating a trust relationship between the first credential-issuing organization and a second credential-issuing organization, the trust relationship indicating whether the user device should be granted access to use a second credential as a result of the user having been authorized by the first credential-issuing organization, wherein the second credential is different from the first credential and was issued by a second credential-issuing organization, the second credential-issuing organization being different from the first credential-issuing organization, the first credential-issuing organization and the second credential-issuing organization being third parties with respect to the server system;
   determining, by the server system, that the accessed trust data indicates that the user device should be granted access to use the second credential issued by the second credential-issuing organization based on the trust relationship between the first credential-issuing organization and the second credential-issuing organization; and
   granting, by the server system, access to the user device to use the second credential.

2. The method of claim 1, wherein determining that the user has been authorized by the first credential-issuing organization comprises:
   receiving, at the server system and from the user device, first authentication information that is associated with the first credential-issuing organization and that identifies the user;
   accessing a user account for the user, wherein the user account is maintained by the server system; and
   determining, based on accessing the user account, that the first authentication information was validated by the first credential-issuing organization.

3. The method of claim 1, wherein determining that the user has been authorized by the first credential-issuing organization comprises:
   receiving, at the server system and from the first credential-issuing organization, a message indicating that the user has been authorized by the first credential-issuing organization.

4. The method of claim 1, further comprising:
   receiving, at the server system and from the second credential-issuing organization, at least part of the trust data indicating whether the user device should be granted access to use a second credential issued by the second credential-issuing organization as a result of the user having been authorized by the first credential-issuing organization.

5. The method of claim 1, wherein:
   accessing the trust data comprises accessing data indicating one or more trusted credential-issuing organizations; and
   determining that the accessed trust data indicates that the user device should be granted access to use the second credential issued by the second credential-issuing organization comprises identifying the first credential-issuing organization in the data indicating one or more trusted credential-issuing organizations.

6. The method of claim 1, wherein:
   accessing the trust data comprises accessing data indicating one or more conditions for the first credential-issuing organization to be considered a trusted credential-issuing organization; and
   determining that the accessed trust data indicates that the user device should be granted access to use the second credential issued by the second credential-issuing organization comprises determining that the first credential-issuing organization has met the one or more conditions for being considered a trusted credential-issuing organization.

7. The method of claim 6, wherein determining that the first credential-issuing organization has met the one or more conditions for being considered a trusted credential-issuing organization comprises:
   determining that the first credential-issuing organization has performed a re-authentication action for the user within a particular period of time.

8. The method of claim 1, further comprising:
   accessing user-defined restriction data that has been received at the server system; and
   determining whether the accessed user-defined restriction data further restricts the trust data.

9. The method of claim 8, further comprising:
   determining that the accessed user-defined restriction data indicates that the user device should be granted access to use the second credential.

10. The method of claim 8, further comprising:
    determining that the accessed trust data indicates that the user device should be granted access to use a third credential issued by a third credential-issuing organization;
    determining that the accessed user-defined restriction data indicates that the user device should not be granted access to use the third credential; and
    providing an indication to the user device that the user device is not granted access to use the third credential.

11. The method of claim 1, wherein granting access to the user device to use the second credential issued by the second credential-issuing organization comprises:
    determining that the second credential has already been received at the server system from the second credential-issuing organization;
    accessing the received second credential from a user account of the user; and
    providing the second credential to the user device.

12. The method of claim 1, wherein granting access to the user device to use the second credential issued by the second credential-issuing organization comprises:
    determining that the second credential has not been received at the server system from the second credential-issuing organization;
    providing, to a system operated by the second credential-issuing organization, identifying information for the user;

receiving, from the system operated by the second credential-issuing organization, the second credential;

adding, by the server system, the second credential to a user account of the user; and providing the second credential to the user device.

13. The method of claim 1, wherein granting access to the user device to use the second credential comprises:

granting access to the user device to use the second credential without performing a separate determination that the user has been authorized by the second credential-issuing organization in connection with a current log-in session.

14. The method of claim 1, further comprising:

determining a geographic location associated with the user device;

determining a geographic region associated with the second credential-issuing organization;

determining a match between the geographic location associated with the user device and the geographic region associated with the second credential-issuing organization, and wherein granting access to the user device to use the second credential comprises granting access to the user device to use the second credential as a result of determining a match between the geographic location associated with the user device and the geographic region associated with the second credential-issuing organization.

15. The method of claim 1, further comprising:

determining that the accessed trust data indicates that the user device should be granted access to use a key issued by the second credential-issuing organization; and granting access to the user device to use the key, in addition to the first credential and the second credential.

16. A system comprising:

at least one processor of a server system; and at least one memory coupled to the at least one processor having stored thereon instructions which, when executed by the at least one processor, causes the server system to perform operations comprising:

determining that a user has been authorized by a first credential-issuing organization;

based on determining that the user has been authorized by the first credential-issuing organization, granting access to a user device of the user to use a first credential issued by the first credential-issuing organization for the user;

accessing trust data indicating a trust relationship between the first credential-issuing organization and a second credential-issuing organization, the trust relationship indicating whether the user device should be granted access to use a second credential as a result of the user having been authorized by the first credential-issuing organization, wherein the second credential is different from the first credential and was issued by a second credential-issuing organization, the second credential-issuing organization being different from the first credential-issuing organization, the first credential-issuing organization and the second credential-issuing organization being third parties with respect to the server system;

determining that the accessed trust data indicates that the user device should be granted access to use the second credential issued by the second credential-issuing organization based on the trust relationship between the first credential-issuing organization and the second credential-issuing organization; and in response to determining that the accessed trust data indicates that the user device should be granted access to use the second credential, granting access to the user device to use the second credential.

17. At least one computer-readable storage medium encoded with executable instructions that, when executed by at least one processor in a server system, cause the at least one processor to perform operations comprising:

determining that a user has been authorized by a first credential-issuing organization;

based on determining that the user has been authorized by the first credential-issuing organization, granting access to a user device of the user to use a first credential issued by the first credential-issuing organization for the user;

accessing trust data indicating a trust relationship between the first credential-issuing organization and a second credential-issuing organization, the trust relationship indicating whether the user device should be granted access to use a second credential as a result of the user having been authorized by the first credential-issuing organization, wherein the second credential is different from the first credential and was issued by a second credential-issuing organization, the second credential-issuing organization being different from the first credential-issuing organization, the first credential-issuing organization and the second credential-issuing organization being third parties with respect to the server system;

determining that the accessed trust data indicates that the user device should be granted access to use the second credential issued by the second credential-issuing organization based on the trust relationship between the first credential-issuing organization and the second credential-issuing organization; and in response to determining that the accessed trust data indicates that the user device should be granted access to use the second credential, granting access to the user device to use the second credential.

18. The method of claim 1, wherein:

the trust data comprises (i) a list of organizations that have granted the first credential-issuing organization access to credentials of the organizations included in the list, (ii) one or more credentials and resources for each listed organization; and (iii) one or more trust levels associated with the one or more credentials and resources for each listed organization; and determining that the accessed trust data indicates that the user device should be granted access to use the second credential comprises:

determining that the accessed trust data indicates that the user device should be granted access to use the second credential issued by the second credential-issuing organization based on the second credential-issuing organization being included in a trusted level in the list of organizations and not being included in an untrusted level in the list of organizations.

19. The method of claim 1, wherein the trust data indicates trust relationships between multiple credential-issuing organizations; and wherein the trust relationships indicate a level of trust for each of the multiple credential-issuing organizations with respect to each of the other credential-issuing organizations in the multiple credential-issuing organizations.

20. The method of claim 1, wherein the trust data indicates trust relationships between multiple credential-issuing organizations; and wherein the trust relationships indicate whether specific credentials or keys of different credential-issuing organizations should be made accessible based on authorizations of specific credential-issuing organizations that did not issue the specific credentials or keys.

* * * * *